United States Patent

Remy et al.

[15] 3,639,847

[45] Feb. 1, 1972

[54] CIRCUIT FOR MULTIPLYING TWO ELECTRICAL VALUES

[72] Inventors: Claude Remy, 21 Allee Circulaire, Foret de Vernon par 27, Vernon; Claude Lejannou, Apartment B. 135, 2 rue d'Archimede, Le Val Foure, Jolie; Jacques Leclere, 39 Allee des Penitents, Foret de Vernon par 27, Vernon, all of France

[22] Filed: May 15, 1970

[21] Appl. No.: 37,680

[30] Foreign Application Priority Data

May 20, 1969 France ..............................6916222

[52] U.S. Cl. ..........................328/160, 307/229, 328/145, 328/158

[51] Int. Cl. ..................................................G06g 7/00

[58] Field of Search ..................307/229, 230; 328/160, 161, 328/145, 158; 235/194, 197; 331/108

[56] References Cited

UNITED STATES PATENTS

| | | | |
|---|---|---|---|
| 3,363,188 | 1/1968 | Gardere | 328/160 X |
| 3,092,720 | 6/1963 | Vrijer et al. | 235/194 X |
| 2,935,698 | 5/1960 | Adams | 331/108 X |
| 3,215,824 | 11/1965 | Alexander et al. | 235/194 X |

*Primary Examiner*—Donald D. Forrer
*Assistant Examiner*—B. P. Davis
*Attorney*—Robert E. Burns and Emmanuel J. Lobato

[57] ABSTRACT

This invention relates to a circuit for multiplying two electrical values. A monitoring oscillator transmits short sampling pulses to a pulse time modulator to which a signal corresponding to the first electrical value is also impressed. A control chopping stage is inserted in a feedback line between the input of said modulator and its output, which is connected to an output chopping stage to which a voltage corresponding to the second electrical value is impressed, and on the output of which pulses appear having a duration and an amplitude respectively proportional to the first and second electrical values.

13 Claims, 7 Drawing Figures

CIRCUIT FOR MULTIPLYING TWO ELECTRICAL VALUES

BACKGROUND OF THE INVENTION

The head patent relates to a circuit for multiplying two electrical values, which comprises a pulse time modulator receiving at a first input a signal corresponding to the first electrical value and at a second input short sampling pulses produced by a monitoring oscillator, as well as an output chopping stage receiving at a first input connected to the output of said modulator periodic pulses at the oscillator rate which have each a duration proportional to the value of the first electrical value, and at a second input a voltage corresponding to the second electrical value, said output stage producing at its output end periodic pulses having each a duration and an amplitude proportional to said first and second electrical values, respectively, and therefore an average value proportional to their product.

The present certificate of addition is concerned with means adapted, when applied to the multiplying circuit according to the head patent, to produce the same results but through a very wide range of temperatures; the multiplying circuit according to this invention permits notably of determining the product of two electrical values with a precision of at least 0.1 percent within a temperature range from −100° to +130° C.

SUMMARY OF THE INVENTION

The multiplying circuit according to this invention is of the type set forth hereinabove, according to the head patent, and is further characterized in that, to improve its precision and maintain its operating stability through a very wide range of temperatures (preferably from −100° to +130° C.), a control chopping stage of same design as the output chopping stage is inserted in a feedback line connecting the modulator output to the modulator input.

With the provision of said control chopping stage providing a feedback between the output and input of the time pulse modulator, the precision of the amplitude-to-time conversion carried out by said modulator is at least equal to 0.10 percent throughout the very wide temperature range mentioned hereinabove, with a depth of time pulse modulation of 5 to 95 percent.

BRIEF DESCRIPTION OF THE DRAWING

Several specific forms of embodiment of the multiplying circuit according to this invention are described hereinafter and illustrated in the attached drawing by way of example. In the drawing.

DESCRIPTION OF THE PREFERRED EMBODIMENT

Figures 1, 3, 4, 5, 6, 7:
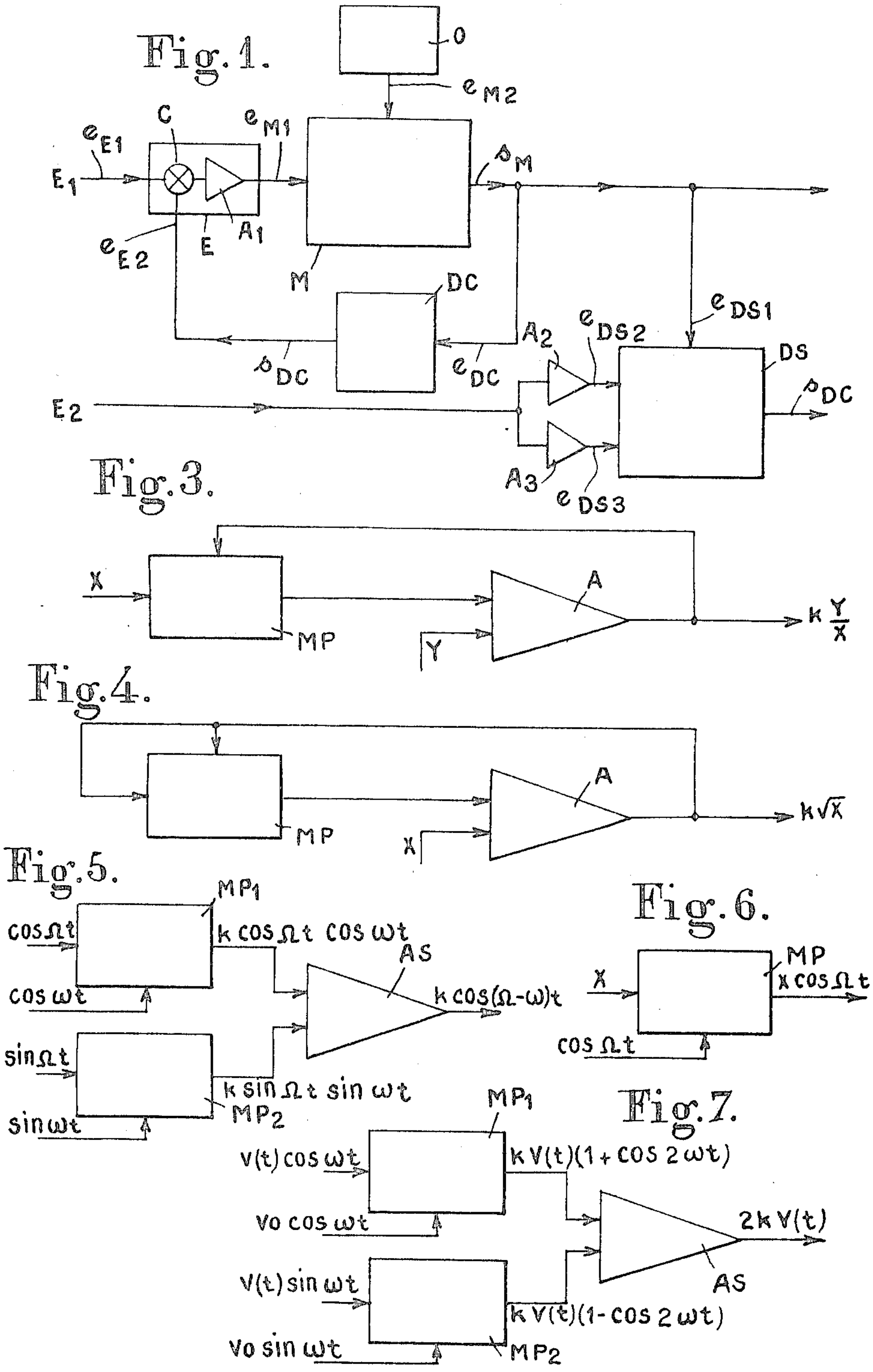
FIG. 1 is the general synoptic diagram of the multiplying circuit according to this invention.

Referring first to the synoptic diagram of FIG. 1 the first electrical value $E_1$, for example an electric voltage, is fed through an input stage E to the first input $e_{M1}$ of a time pulse modulator M of which the second input $e_{M2}$ receives short sampling pulses produced by a monitoring oscillator O; the output $s_M$ of modulator M transmits periodic pulses at the rate of oscillator O, each pulse having a duration proportional to the value of the first electrical value $E_1$, in parallel to the first input $e_{DS1}$ of an output chopping stage DC having its output $s_{DC}$ connected to the input $e_{E2}$ of input stage E; this input stage E, in the example illustrated, consists of a comparator C having its two inputs connected to the inputs $e_{E1}$ and $e_{E2}$ respectively of input stage E, and of an operational amplifier $A_1$ inserted between the output of said comparator C and the input $E_{M1}$ of modulator M. On the other hand, the second electrical value $E_2$, for example an electric voltage, is fed in parallel to the inputs of a pair of operational amplifiers $A_2$ and $A_3$, respectively, of which the outputs produce voltages equal to each other and proportional to $E_2$, but of opposite signs, which are fed to the inputs $e_{DS2}$ and $e_{DS3}$ respectively of the output chopping stage DS. The periodic pulses having a duration proportional to the value of the first electrical value $E_1$, which are transmitted to the input $e_{DS1}$ of the output chopping stage DS, are amplitude modulated therein in proportion to the value of the second electrical value $E_2$, whereby the output $s_{D1}$ of the output chopping stage DS delivers periodic pulses at the rate of oscillator O having each a duration and amplitude proportional to the first electrical value $E_1$ and to the second electrical value $E_2$, respectively, and therefore the average value of these pulses is proportional to the product $E_1 \times E_2$.

Figure 2:
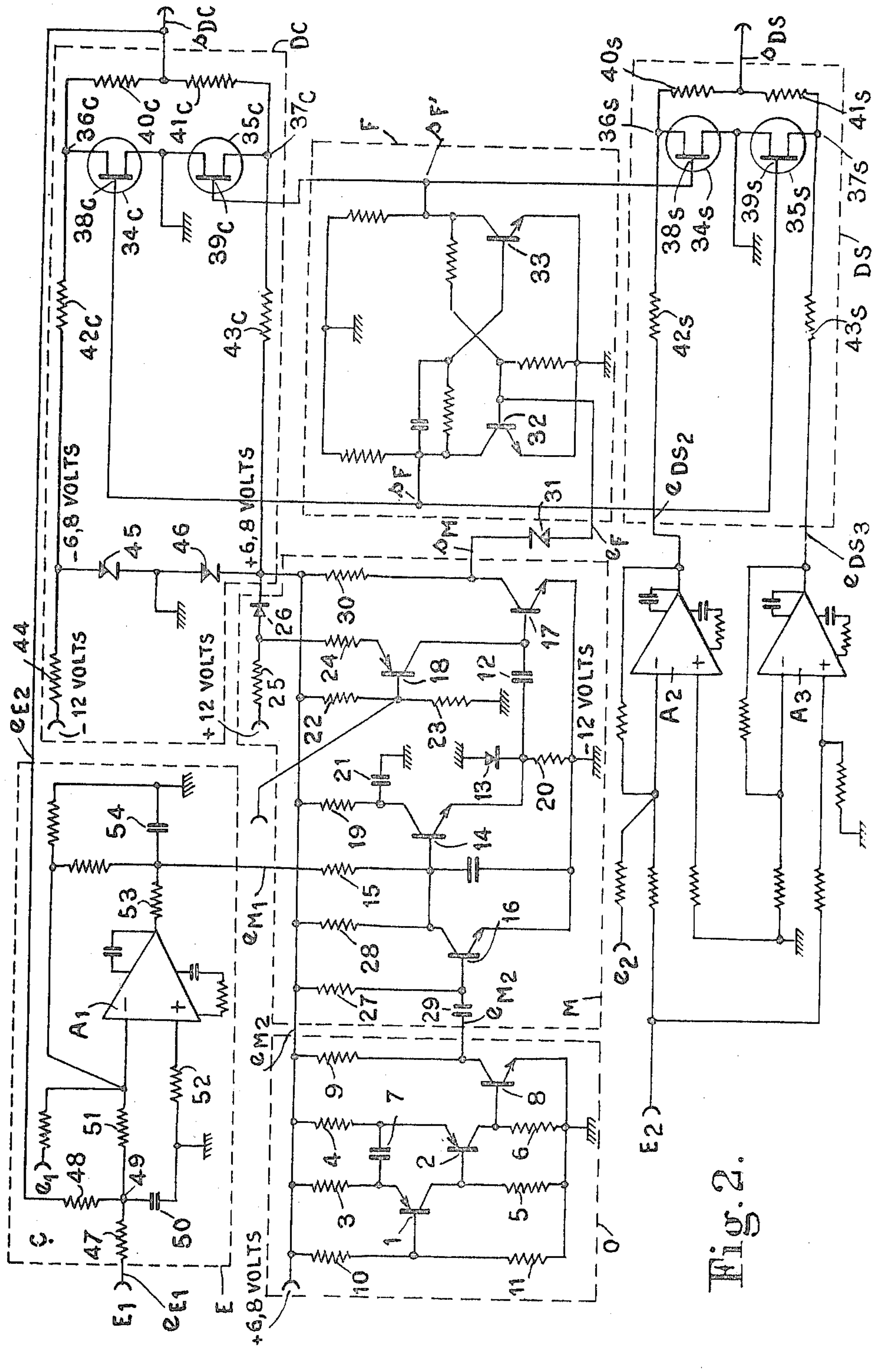
FIG. 2 is the detailed wiring diagram of a specific form of embodiment of this invention; pp FIGS. 3 to 7 inclusive illustrate various applications of the multiplying circuit according to the head patent and to the present certificate of addition.

In the form of embodiment illustrated in detail in FIG. 2 the monitoring oscillator consists essentially of a pair of transistors 1 and 2 having their emitters connected through resistors 3 and 4 respectively to a source of direct current having a value of 6.8 volts, the collectors of said transistors 1 and 2 being grounded via resistors 5 and 6, respectively; the collector of transistor 1 is connected directly to the base of transistor 2, so that these transistors are mounted in cascade; a capacitor 7 is inserted between the emitters of these transistors 1 and 2; finally, an output stage of the monitoring oscillator O consists of a transistor 8 having its collector fed with the 6.8-volt DC through a resistor 9, the emitter of this transistor 8 being grounded and its base connected to the collector of transistor 2.

The above-mentioned monitoring oscillator O operates as follows: The pair of cascade transistors 1 and 2 constitute, with their bias resistors and capacitor 7, an astable multivibrator of which the trigger frequency is dependent both on the time constant of the charging circuit of capacitor 7 which includes resistor 3 and transistor 2 then conductive, and on the time constant of the discharge circuit of said capacitor 7 which includes resistor 4 and transistor 1, then conductive; both transistors 1 and 2 are thus alternatively conductive and nonconductive, and when they are conductive the base of transistor 1 is biased by resistors 10 and 11 whereby this transistor cannot be saturated under any circumstances, in contrast to the other transistor 2 which is constantly strongly saturated in order to compensate the temperature drift of transistor 8 when one of the disks or plates of capacitor 7 is grounded through transistor 2 then conductive, and the base-emitter junction of transistor 8. Similarly, the values of resistors 3 and 4, and that of capacitor 7, which determine the charge and discharge time constants of said capacitor 7 and therefore the frequency of the monitoring oscillator O, are selected with a view to minimize the frequency drift effect due to variations in the parameters of said transistors 1 and 2 as a function of temperature. Transistor 8 is alternately nonconductive and conductive, at the same rate as transistor 2; its function is to provide the necessary coupling between the unstable or monostable multivibrator comprising essentially transistors 1 and 2, on the one hand, and the input $e_{M2}$ of modulator M, on the other hand, while providing the adaptation of the corresponding impedance.

In the form of embodiment illustrated in FIG. 1 the time pulse modulator M consists essentially of a capacitor 12 having its first plate (in the left-hand portion of FIG. 2) adapted to be connected on the one hand to the ground via a diode 13 having its anode grounded directly, and on the other hand to a first input $e_{M1}$ of modulator M through the medium of a first transistor-switch 14 and an ohmic resistor 15 inserted between $e_{M1}$ and the base of said transistor-switch 14; in the form of embodiment illustrated the transistor-switch 14 is controlled from the second input $e_{M2}$ of modulator M via a transistor stage 16. The second plate (on the right-hand portion of FIG. 9) of capacitor 12, on the one hand, may be grounded through the base-emitter junction of a second transistor-switch 17 and on the other hand is connected to a circuit for delivering the discharge current from said capacitor 12, which circuit consists essentially of a transistor 18. The collector of transistor 14, and its emitter connected to the common point of the first plate of capacitor 12 and of the cathode of diode 13, receive voltages of opposite polarities, of +6.8 volts and −12 volts respectively, through resistors 19 and 20, respectively. The collector of the first transistor-switch 14 is also grounded through a bypass condenser 21. The emitter of transistor 18, in the current-delivery circuit, of which the base is biased by a voltage divider comprising ohmic resistors 22 and 23, receives through a resistor 24 a positive DC taken from the center tap of a voltage divider inserted between two voltage sources of same polarity but different values, namely +12 volts and +6.8 volts, this last-named voltage divider consisting of an ohmic resistor 25 in series with a diode 26 connected in the positive direction.

The time pulse modulator M just described operates as follows: The transistor 16 having its emitter grounded directly and its base and collector supplied with a positive 6.8 volt voltage through resistors 27 and 28, respectively, is normally conductive with a strong saturation, so that the common point of resistors 15 and 28 is normally a ground potential. In this first form of embodiment the gates occurring at the input $e_{M2}$ of modulator M, with the high frequency of the monitoring oscillator 0, of at least 100 kHz., are transmitted via a series-connected capacitor 29 to the base of transistor 16 of which the saturation is thus suppressed periodically during a very short moment, of the order of 0.2 microsecond; instead of being brought to ground voltage the base of transistor 14 is thus brought, through the voltage divider consisting of resistors 15 and 28, to a voltage corresponding to that fed to the input $e_{M1}$ of modulator M, that is, a voltage proportional to the first electrical value $E_1$, as will be explained more in detail presently; thus a sampling of the first electrical value $E_1$ takes place during a time period depending on the time constant corresponding to resistor 27 in series with capacitor 29. The voltage produced across the terminals of resistor 20, which is then proportional to the voltage fed to the base of transistor 14 and therefore to the first electrical value $E_1$, will then charge capacitor 12 of which the second plate or disk is on the other hand grounded via the base-emitter junction of transistor 17, then conductive. The energy necessary for very rapidly charging capacitor 12 to the sampled voltage is provided by the other capacitor 21 inserted between the ground and the collector of transistor-switch 14; under these conditions, the source delivering the +6.8-volt DC is safely protected against sudden heavy current draws. The bypass cell consisting of said capacitor 21 and resistor 19 will thus prevent any reaction from modulator M with respect to monitoring oscillator 0 which might prove detrimental to the proper operation of the assembly, notably in case the sampling voltage were attended by a deep time modulation of the pulses. When, at the end of each sampling operation, transistor 16 becomes again saturated, the series-connected diode 13 and resistor 20 restore the emitter voltage of transistor 14 and therefore also that of the first plate of capacitor 12 to a value approximating that of the ground voltage, so that the potential difference created by the charge between the two plates of said capacitor 12 will render transistor 17 nonconductive, whereby the current delivery circuit 18–24 begins to charge capacitor 12 until the potential of its second plate has been restored to the threshold value whereat the second transistor-switch 17 resumes its conductive state. As the discharge current produced by the current delivery circuit 18–24 is constant periodic positive-voltage pulses having the same rate of recurrence as the sampling pulses are produced across the terminals of the resistor of collector 30 of transistor-switch 17, as determined by the monitoring oscillator 0, each one of said positive-voltage pulses having a duration proportional to the voltage at which the capacitor 12 was charged and therefore to the sampled value of the first electric value $E_1$.

The above-mentioned precision of the time pulse modulator M described hereinabove is due essentially to the following elements: Assuming that transistor 16 is normally strongly saturated, the voltage sample is taken from the voltage divider comprising resistors 15 and 28 under low-impedance conditions, so that a particularly rapid and accurate sampling can be achieved; the bypass cell comprising resistor 19 and capacitor 21 increases the linearity of the time pulse modulator M, considering the high frequency rate of the monitoring oscillator 0 and the use of high-modulation rates; the circuit consisting of the series-connected diode 13 and resistor 20 affords a maximum signal range at the base of transistor 17; it ensures a stable potential reference for the emitter of transistor 14 during the nonconductive period of transistor 17; finally, it prevents any sampling of negative voltage in case of saturation; the shift of the discharge current delivery circuit 18–24 as a function of temperature is strongly attenuated by the presence of the diode 26 in the supply circuit of the emitter of transistor 18. The values of resistors 15, 28 and 24 are selected preferably with a view to produce, at the output $s_M$ of modulator M which is connected to the collector of transistor 17, pulses having a cyclic ratio of 1:2 when $E_1$=0.

In the form of embodiment illustrated in FIG. 2 the asymmetric output $s_M$ of modulator M, which corresponds to the collector of the second transistor switch 17, is connected via a Zener diode 31 to the control input $e_F$ of a flip-flop circuit F for shaping the output pulses, which comprises essentially two transistors 32 and 33 assembled to constitute a bistable multivibrator. The function of the Zener diode 31, between the output $s_M$ of modulator M and the control input $e_F$ of the bistable multivibrator circuit F, consists on the one hand in providing the DC insulation and on the other hand, by virtue of its interelectrode capacity, the variable-current coupling, whereby the position of the bistable multivibrator circuit F constantly corresponds, in an univocal fashion, to the conductive or nonconductive state of output transistor 17 of modulator M, independently of any strays likely to appear in the circuit.

The two symmetrical outputs $s_F$ and $s_{F'}$ of the bistable multivibrator circuit F are connected in parallel to the two symmetrical inputs, respectively, of the control chopping stage DC and output chopping stage DS. In the form of embodiment illustrated in FIG. 2 this output chopping stage DS and the control chopping stage DC consist each and identically of a pair of field-effect transistors $34_S$, $35_S$ or $34_C$, $35_C$ so mounted that their respective main circuits be in series with each other between two supply terminals $36_S$ and $37_S$, or $36_C$ and $37_C$, their gate electrodes $38_C$, $39_C$ or $38_S$, $39_S$ being connected to the symmetrical outputs $s_F$ and $s_{F'}$ respectively of the bistable multivibrator circuit F; the output $S_{DS}$ or $S_{DC}$ of each chopping stage DS, DC consists of the common point of a pair of resistors $40_C$, $41_C$ or $40_S$, $41_S$ mounted in series between the pair of supply terminals $36_S$, $37_S$ or $36_C$, $37_C$. In the form of embodiment illustrated, continuous voltages of opposite polarities, of −6.8 Volts and +6.8 Volts respectively, derived from −12-volt and +12-volt DC sources, respectively via resistors 25 and 44, and a pair of Zener diodes 45, 46 having a common grounded electrode, are fed to the pair of supply terminals $36_C$, $37_C$ of the control chopping stage DC through a pair of series-connected equal resistors $42_C$ and $43_C$; the function of the pair of Zener diodes 45 and 46 is to stabilize the two voltages fed to the supply terminals of the control chopping stage DC; as these diodes are mounted in series, their differential temperature coefficient is on the other hand substantially zero.

The first electrical value $E_1$ and the voltage available at the output $s_{DC}$ of the control chopping stage DC are fed to the two inputs $e_{E1}$ and $e_{E2}$ of the input stage E and notably of its comparator C; in the specific form of embodiment illustrated this comparator C consists essentially of a pair of ohmic resistors 47 and 48 inserted between the two inputs $e_{E1}$ and $e_{E2}$ and a point 49, respectively, this point 49 constituting the output of comparator C, a filter capacitor 50 being connected in parallel between this output 49 and the ground. The voltage filtered by capacitor 50 and proportional to the difference between the voltage corresponding to the first electrical value $E_1$, on the one hand, and the output voltage of the control chopping stage DC, on the other hand, which appears at the output 49 of comparator C is fed via a resistor 51 to one of the two inputs of opposite polarities of an operational amplifier $A_1$ having its other input grounded through an ohmic resistor 52. The output of this amplifier $A_1$ is connected via an ohmic resistor 53 to the input $e_{M1}$ of time pulse modulator M. The feedback produced between the output $s_M$ and input $e_{M1}$ of modulator M by the bistable multivibrator circuit F, the control chopping stage DC and the input stage E, gives the certainty that the periodic pulses produced at said output $s_{DC}$ have a cyclic ratio Proportional to the first input value $E_1$ with a precision of the order of 0.01 percent for a modulation depth within the range of 5 to 95 percent, and still of the order of 0.1 percent for a greater modulation depth within the range of 2 to 98 percent. The capacitor 50 connected in parallel between the output 49 of comparator C and the ground is necessary for filtering the pulse voltage fed to the input $e_{E2}$ of input stage E; however, its presence causes a phase shift of the feedback signal fed to said input $e_{E2}$; nevertheless, since this capacitor 50 applies exactly the same phase shift to the voltage corresponding to the first electrical value $E_1$, no increment in the gain as a function of frequency results therefrom up to frequencies of several kHz., this feature being obtained without requiring any corresponding adjustment. In the form of embodiment illustrated the terminal of resistor 53 opposed to the output of the aforesaid operational amplifier $A_1$ is grounded on the other hand through a capacitor 54, with the result that the output impedance of operational amplifier $A_1$ is reduced very strongly at the frequency of the monitoring oscillator O, so that said operational amplifier $A_1$ is protected from possible disturbances likely to result from the fact that its charge resistor 15 is modulated by transistor 14 of modulator M at the sampling frequency.

In the specific form of embodiment illustrated in FIG. 2, the output chopping stage DS described hereinabove is exactly identical with the control chopping stage DC according to a feature characterizing this invention. The voltage corresponding to the second electrical value $E_2$ is fed in parallel to the inputs of opposite polarities, respectively, of a pair of operational amplifiers $A_2$ and $A_3$ of same gain but opposite signs, having their outputs connected to the two inputs $e_{DS2}$ and $E_{DS3}$ of the output chopping stage DS which are connected in turn to its supply terminals $36_S$ and $37_S$, respectively, through ohmic resistors, preferably of equal values, denoted $42_S$ and $43_S$. The output chopping stage DS operates exactly in the same manner (described hereinabove) as the control chopping stage DC, except that its two supply voltages of opposite polarities are both proportional to the second electrical value $E_2$, so that its output $s_{DS}$ corresponding to the common point of resistors $40_S$ and $41_S$ delivers periodic pulses the recurrence frequency of which corresponds to the sampling frequency produced by the monitoring oscillator 0, each one of these pulses having not only a duration proportional to the first electrical value $E_1$ but also an amplitude proportional to the second electrical amplitude $E_2$, the average value of these electric pulses being therefore proportional to the produce $E_1 \times E_{2a}$, with a precision of the order of 0.1 percent. As already explained hereinabove, the pulses produced at the output $s_{DS}$ have a cyclic ratio of 1:2 and therefore a zero mean value when the first electrical value $E_1$ is zero or varies in sine fashion as a function of time.

The operational amplifiers $A_1$, $A_2$ and $A_3$ consist preferably of commercial integrated circuits, preferably of the $\mu$A709 type. Instead of consisting essentially of field-effect transistors, the chopping stages DS and DC may also be equipped with conventional transistors-switches of the quick-operating type, or even with phototransistors controlled by electroluminescence; this latter arrangement may be particularly advantageous in certain applications requiring a considerable insulation of the channels affected, in the multiplying circuit of this invention, to the two electrical values $E_1$ and $E_2$; this applies for example when a multiplying circuit according to the present invention is utilized for making a three-phase wattmeter.

A multiplying circuit according to this invention and comprising the elements described hereinabove is affected by a shift of $10^{-4}$ per degree centigrade with a time modulation of 5 to 95 percent, in a temperature range of −50° to +85° C.; the precision is still of the order of 0.1 percent between −100° and +130° C. This precision may be obtained directly by current manufacture, without requiring any subsequent adjustment, provided only that possible zero constant errors of the order of $2.10^{-2}$ are admitted. However, these zero constant errors may be cancelled by injecting low-compensation currents into the auxiliary inputs $e_1$ and $e_2$ of operational amplifiers $A_1$ and $A_2$, and also into the output $s_{DS}$ of the output chopping stage DS. These compensations are of course useless if the electrical values $E_1$ and $E_2$ vary alternatively with time.

FIGS. 3 and 4 illustrate the application of a multiplying circuit MP according to this invention to the calculation of the quotient of two electrical values X and Y, and of the square root of an electrical value X, respectively; in either case the reference letter A designates a high-gain amplifier.

FIG. 5 illustrates the use of two multipliers according to this invention $MP_1$ and $MP_2$ for constructing a filterless frequency changer; As denotes a summing-amplifier; very similar mountings may be constructed for producing at the output the additive frequency as well as the substractive frequency.

FIG. 6 illustrates the application of a multiplying circuit according to this invention, MP, for modulating an electrical value X by a variable electrical value cos ΩT.

FIG. 7 illustrates the application of two multiplying circuits according to the invention, $MP_1$ and $MP_2$, for demodulating a value $V(t)\cos \omega t$ when two variable electrical values $V_0 \cos \omega t$ and $V_0 \sin \omega t$ are available; AS designates a summing-amplifier; the demodulator thus obtained is characterized by the essential feature of operating without any filter element. A simpler demodulator may be obtained by using a single multiplier and connecting its output to suitable filter means.

What we claim is:

1. A circuit for multiplying first and second electrical values, comprising a monitoring oscillator with an output for transmitting short sampling pulses, a pulse time modulator with a first input connected to said oscillator output, a second input to which a signal corresponding to the first electrical value is transmitted and an output for transmitting periodic pulses, each having a duration proportional to said first electrical value, a feedback line connected between said output and said second input of the modulator, a control chopping stage inserted in said feedback line, and an output chopping stage similar to said control chopping stage and having a first input connected to the output of said modulator, a second input on which a voltage corresponding to the second electrical value is impressed, and an output for transmitting periodic output pulses whereby each of said output pulses has a duration and an amplitude respectively proportional to said first and second electrical values in the range of temperatures from −100° to +130° C. said pulse time modulator consisting essentially of a capacitor having a first plate connected alternately to the second input of said modulator and to the ground, through a first reversing switch controlled from the first input of said modulator connected to said monitoring oscillator output by means of a normally highly saturated transistor stage, said capacitor having a second plate connected alternately to the ground and to a circuit for injecting discharge current into said capacitor, through a second reversing switch having a control threshold.

2. A multiplying circuit according to claim 1, in which the monitoring oscillator consists essentially of first and second transistors which are cascademounted for controlling respectively and successively the discharge and charge of a same capacitor, said first transistor being operated under unsaturated conditions and said second transistor under saturated conditions, and of an output stage comprising a decoupling transistor.

3. A multiplying circuit according to claim 1, in which said first reversing switch consists essentially of a diode inserted between the first plate of said capacitor and the ground, and a switching transistor having first and second electrodes, of which the latter is also connected to the first plate of said capacitor, bias voltages of opposite polarities being impressed respectively on said first and second electrodes, and the third electrode of said switching transistor being connected directly to the second input of said modulator and to the first input of said modulator through said transistor stage.

4. A multiplying circuit according to claim 3, in which the first electrode of the switching transistor on which the bias voltage is impressed through a resistor is furthermore grounded through a bypass capacitor.

5. A multiplying circuit according to claim 1 in which the current injection circuit consists essentially of a transistor, the emitter voltage of which is taken from the center tap of a voltage divider inserted between two voltage sources of same polarity, but different values, and consisting of an ohmic resistor in series with a diode connected to be biased in the positive direction.

6. A multiplying circuit according to claim 1, in which said second reversing switch consists essentially of a switching transistor having a first electrode connected to the second plate of said capacitor, a second electrode being grounded, and a third output electrode connected to a load resistor.

7. A multiplying circuit according to claim 1, in which the second reversing switch has an asymmetric output connected to the control input of a pulse shaping bistable multivibrator circuit having two symmetric outputs.

8. A multiplying circuit according to claim 7, in which the output electrode of the switching transistor in said second reversing switch is connected through a Zener diode to the control input of said pulse shaping bistable multivibrator circuit.

9. A multiplying circuit according to claim 7, in which both said output chopping stage and said control chopping stage consist each of a pair of field-effect transistors having main circuits connected in series with each other between a pair of supply terminals and gate electrodes connected to the symmetrical outputs of the pulse-shaping bistable multivibrator circuit, the output voltage of each of both said chopping stages being taken from the common point of two equal resistors mounted in series across said two supply terminals.

10. A multiplying circuit according to claim 9, in which the two supply terminals of the control chopping stage receive, through a pair of equal resistors, DC voltages of opposite polarities, and means comprising two identical Zener diodes connected in series are provided to stabilize said DC voltages.

11. A multiplying circuit according to claim 9, in which the first electrical value and the output voltage of said control chopping stage are fed to the two inputs of a single filter comparator having an output for delivering a filtered voltage proportional to the difference between the two compared values, said comparator output being connected to the input of an operational amplifier having an output connected to the second input of the pulse time modulator.

12. A multiplying circuit according to claim 11, in which said comparator consists essentially of two resistors inserted between its two inputs and its output, respectively, and of a filter capacitor connected in parallel between its output and the ground.

13. A multiplying circuit according to claim 9, in which the voltage corresponding to the second electrical value is fed in parallel to the inputs of opposite polarities of two operational amplifiers, respectively, said amplifiers having the same gain characteristics but opposite signs, and their outputs being connected to the two supply terminals of the output chopping stage, through two equal resistors.

* * * * *